(12) United States Patent
Friebe et al.

(10) Patent No.: US 7,049,384 B1
(45) Date of Patent: May 23, 2006

(54) CONDENSATION CROSS-LINKING POLYSILOXANE MASSES, A PROCESS FOR PREPARING THE SAME AND SURFACE-MODIFIED FILLERS

(75) Inventors: Robert Friebe, Leverkusen (DE); Wilhelm Weber, Leverkusen (DE); Karl-Heinz Sockel, Leverkusen (DE)

(73) Assignee: GE Bayer Silicones GmbH & Co. KG, Erkrath (DE)

( * ) Notice: Subject to any disclaimer, the term of this patent is extended or adjusted under 35 U.S.C. 154(b) by 315 days.

(21) Appl. No.: 08/894,824

(22) PCT Filed: Mar. 1, 1996

(86) PCT No.: PCT/EP96/00837

§ 371 (c)(1),
(2), (4) Date: Aug. 29, 1997

(87) PCT Pub. No.: WO96/27636

PCT Pub. Date: Sep. 12, 1996

(30) Foreign Application Priority Data

Mar. 3, 1995 (DE) ............................... 195 07 416

(51) Int. Cl.
*C08G 77/08* (2006.01)

(52) U.S. Cl. ........................... 528/17; 528/18; 528/34; 524/863

(58) Field of Classification Search ................ 528/17, 528/18, 34; 524/863
See application file for complete search history.

(56) References Cited

U.S. PATENT DOCUMENTS

| | | | | |
|---|---|---|---|---|
| 4,147,855 A | * | 4/1979 | Schiller et al. | 528/33 |
| 4,296,228 A | * | 10/1981 | Innertsberger et al. | 528/33 |
| 4,434,283 A | * | 2/1984 | Sattlegger et al. | 528/34 |
| 4,657,978 A | * | 4/1987 | Wakabayashi et al. | 525/100 |
| 5,063,087 A | * | 11/1991 | Eck et al. | 427/302 |
| 5,502,096 A | * | 3/1996 | Kimura et al. | 524/356 |
| 5,728,794 A | * | 3/1998 | Friebe et al. | 528/23 |
| 5,914,382 A | * | 6/1999 | Friebe et al. | 528/23 |

* cited by examiner

*Primary Examiner*—Margaret G. Moore
(74) *Attorney, Agent, or Firm*—Norris McLaughlin & Marcus PA

(57) ABSTRACT

The present invention relates to polysiloxane compositions which cross-link by condensation and contain at least one cross-linkable polysiloxane, at least one basic filler, at least one phosphorus compound, at least one alkoxysilane cross-linking agent, at least one organometallic compound and optionally other auxiliary substances, a process for their production and their use, as well as surface-modified fillers and their use.

8 Claims, No Drawings

CONDENSATION CROSS-LINKING POLYSILOXANE MASSES, A PROCESS FOR PREPARING THE SAME AND SURFACE-MODIFIED FILLERS

The present invention relates to polysiloxane compositions which cross-link by condensation and contain at least one cross-linkable polysiloxane, at least one basic filler, at least one phosphorus compound, at least one alkoxysilane crosslinking agent, at least one organometallic compound and optionally other auxiliary substances, a process for their production and their use, as well as surface-modified fillers and their use.

The polysiloxane compositions according to the invention, referred to hereinafter as RTV-1 (Room-temperature vulcanizing 1-component) alkoxy systems, are compositions which are storable with the exclusion of moisture and cure to form elastomers on exposure to atmospheric moisture with the elimination of alcohols.

Products of this kind have been known for a very long time and have been widely used on the market as sealants. The production of such compositions from OH— or alkoxy-terminated polysiloxanes, optionally unreactive polysiloxane plasticizers, alkoxysilane cross-linking agents, catalysts, fillers and optionally other auxiliary substances is known from U.S. Pat. No. 3,294,739, U.S. Pat. No. 3,161,614 and U.S. Pat. No. 3,494,951.

The material costs of RTV-1 compositions can be considerably reduced by the use of fillers. The fillers do however not only render the compositions less costly but they also substantially influence the properties of the RTV-1 alkoxy systems. The concentration and composition of the fillers used has a crucial effect on the rheological properties of the unvulcanized compositions, such as their thixotropy and flow behaviour. They are furthermore important for the mechanical properties of the cured vulcanizates, such as their tear resistance, elongation at break and modulus of elasticity. Chalks are for example very frequently used as fillers for RTV-1 compositions. Ground natural chalk is usually used together with pyrogenic silicic acid. The silicic acid is necessary in this combination if thixotropic compositions are required. Precipitated chalks may be used as an alternative. These chalks can likewise be combined with silicic acid and also with natural chalk. However, in sufficient concentrations, they yield thixotropic compositions even without silicic acid. Sealants which contain precipitated chalk are distinguished by high tear resistance and elongation at break as well as good adhesion and they are therefore very suitable for the typical applications in the RTV-1 field, such as for example as sealants.

The incorporation of fillers into RTV-1 compositions, in particular at elevated concentrations, can lead to a high increase in viscosity. This high viscosity can cause difficulties in the production of the compositions and also impair their processing. In addition, at high degrees of filling, the modulus of elasticity of the cured sealants increases and their elongation at break is reduced. Precisely the use of precipitated chalks can lead to very high elastic moduli, which are undesirable for the use of the RTV-1 alkoxy systems as sealants. One further disadvantage which can result from the use of the fillers, such as for example the chalks and in particular the precipitated chalks in RTV-1 alkoxy systems, is the reduced storage life of the unvulcanized pastes. If such RTV-1 products are stored with the exclusion of atmospheric moisture and samples are taken from time to time, their cross-linkability suffers as a function of the storage time. Finally they even completely fail to cross-link upon exposure to atmospheric moisture. RTV-1 alkoxy systems generally have shorter storage lives than other RTV-1 compositions. Due to the reduction in their shelf-lives they only have limited applicability.

The rheological properties of highly-filled RTV-1 polysiloxane compositions can be improved by additives. Different additives have been described in the literature for the various cross-linking systems. Apart from affecting the rheological properties and changing the incorporability of fillers, these additives also change the mechanical properties of the vulcanizates. They usually reduce the modulus of elasticity. By the addition of such auxiliary substances other important properties of the products can however be impaired, such as for example the storage life of the unvulcanized compositions and their adhesive properties.

Sulphonic acids, and in particular dodecylbenzenesulphonic acid and its salts, are known from EP-A-314 313 and EP-A 314 314 as suitable additives. These sulphonic-acid-containing RTV-1 alkoxy systems result in low moduli of elasticity of the vulcanizates, and the storage life of the unvulcanized products which, without the addition of the sulphonic acid, is relatively small, is not improved by the addition of dodecylbenzenesulphonic acid.

In DE-A-2007002 etherified or esterified polyglycols are used in filled RTV-1 compositions. These products are prepared with the use of various silane crosslinking agents containing at least one nitrogen atom in the molecule, such as for example oximo-, amino- or aminoxysilane cross-linking agents. In DE-A-2 653 499, phosphoric acid esters are described, in combination with the same crosslinking agents. Suitable additives for alkoxy systems that have a low modulus of elasticity and a good storage life are not known.

The problem therefore existed of developing filled RTV-1 alkoxy systems that possess a low modulus of elasticity, high elongation at break and good storage lives in their unvulcanized state. In addition, upon curing they should adhere well to many substrates.

Surprisingly, it has now been found that the known disadvantages of highly-filled polysiloxane compositions that cure at room temperature on exposure to atmospheric moisture and release alcohols as cleavage products can be very largely eliminated if phosphoric acid esters and/or polyphosphoric acid esters are added as additives to the compositions. By means of these additives, both the mechanical properties of the cured rubbers and their storage life in the unvulcanized state are markedly improved.

The present invention provides polysiloxane compositions which cross-link by condensation and contain a) at least one cross-linkable polysiloxane that contains as reactive terminal group at least one of the following groups

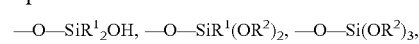

wherein $R^1$ denotes optionally substituted $C_1$–$C_8$-alkyl, $C_6$–$C_{14}$-aryl or $C_2$–$C_8$alkenyl groups and $R^2$ denotes optionally substituted linear or branched $C_1$–$C_8$-alkyl or $C_2$–$C_8$-alkoxyalkyl groups, and $R^1$ and $R^2$ may be the same or different within the molecule, b) at least one basic filler and optionally other fillers, c) at least one phosphorus compound from the group comprising orthophosphoric acid esters of the following formula I

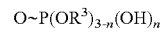

in which n=0, 1 or 2 and

R³=an optionally substituted linear or branched $C_1$–$C_{30}$-alkyl, $C_1$–$C_{30}$-acyl, $C_2$–$C_{30}$-alkenyl, $C_2$–$C_{30}$-alkoxyalkyl,
$C_5$–$C_{14}$-cycloalkyl or $C_6$–$C_{10}$-aryl group or a triorganosilyl or diorganoalkoxysilyl group which can be the same or different within the molecule,
and/or the esters of polyphosphoric acid,
d) at least one alkoxysilane cross-linking agent of the formula $$R^1_x Si(OR^2)_{4-x},$$

wherein
x=0 and 1, and $R^1$ and $R^2$ can be the same or different within the molecule,
e) at least one organometallic compound and
f) optionally other auxiliary substances, such as for example plasticizers, bonding agents, stabilizers, pigments, fungicides etc.

Cross-linkable polysiloxanes a) for the purposes of the invention are polydiorganosiloxanes, preferably polydimethylsiloxanes, wherein the methyl groups may optionally be partially replaced by vinyl, phenyl, $C_2$ to $C_8$ alkyl or haloalkyl groups. The polydimethylsiloxanes are substantially linear, but can contain small proportions of organosiloxy units having a branching effect. In a preferred specific embodiment of the present invention the cross-linkable polysiloxane a) has a viscosity between 0.1 and 1000 Pa·s, preferably between 10 and 500 Pa·s. In addition the cross-linkable polydiorganosiloxane a) can be partially substituted by unreactive groups, such as for example trimethylsiloxy groups.

In a preferred specific embodiment of the present invention the reactive groups of the polysiloxanes are —O—Si($R^1$)$_2$OH groups, in which $R^1$=an optionally substituted $C_1$–$C_8$-alkyl, $C_6$–$C_{14}$-aryl or $C_2$–$C_8$-alkenyl group, and wherein $R^1$ may be the same or different within the molecule.

The term substituted includes all the usual substituents, such as for example halogen, $NO_2$, $NH_2$, amine, alkoxy, etc.

The basic fillers b) are for example precipitated or ground chalk, metal oxides, sulphates, silicates, hydroxides, carbonates and hydrogencarbonates. Other fillers are e.g. reinforcing and non-reinforcing fillers, such as for example pyrogenic or precipitated silicic acid, carbon black or quartz powder. Both the basic fillers and the other reinforcing or non-reinforcing fillers may optionally be surface-modified. Particularly preferred basic fillers b) are precipitated or ground chalks. Component b) can also consist of mixtures of fillers.

The phosphorus compounds c) according to the invention are esters of ortho- and polyphosphoric acid or mixtures thereof. The esters of orthophosphoric acid are described by the following general formula;

$$O=P(OR^3)_{3-n}(OH)_n,$$

wherein
n=0, 1 or 2 and
R³ denotes an optionally substituted linear or branched $C_1$–$C_{30}$-alkyl, $C_1$–$C_{30}$-acyl, $C_2$–$C_{30}$-alkenyl, $C_2$–$C_{30}$-alkoxyalkyl, $C_5$–$C_{14}$-cycloalkyl or $C_6$–$C_{10}$-aryl group or a triorganosilyl or diorganoalkoxysilyl group, and R³ may be the same or different within the molecule.

In a preferred specific embodiment of the present invention the phosphorus compound c) is an ester of orthophosphoric acid of the formula I, with at least one optionally substituted linear or branched $C_4$–$C_{30}$-alkyl group R³.

Where n=0 at least one of the substituents R³ must be triorganosilyl or diorganoalkoxysily radical.

Examples of phosphoric acid esters c) according to the invention are primary and secondary esters of orthophosphoric acid as well as mixtures thereof, such as di(2-ethylhexyl) phosphate, dihexadecyl phosphate, diisononyl phosphate, monodiisodecyl phosphate, mono(2-ethylhexyl) phosphate and tris(trimethylsilyl) phosphate.

Component c) can likewise be an ester of polyphosphoric acid or a mixture of several polyphosphoric acid esters. Salts of partial ortho- and polyphosphoric acid esters, such as for example alkali metal salts, also are suitable.

Silane cross-linking agents, d) in the polysiloxane compositions according to the invention are alkoxysilanes of the general formula $$R^1_x Si(OR^2)_{4-x}$$

in which
x=0 and 1,
$R^1$ denotes optionally substituted $C_1$–$C_8$ alkyl, $C_6$–$C_{14}$ aryl or $C_2$–$C_8$ alkenyl groups and
$R^2$ denotes optionally substituted $C_1$–$C_8$ alkyl linear or branched $C_1$–$C_8$ alkyl or $C_2$–$C_8$ alkoxyalkyl groups, wherein $R^1$ and $R^2$ can be the same or different within the molecule,
or their mixtures.

Preferred alkoxysilanes are tetraethoxysilane, tetra-n-propoxysilane, methyltriethoxysilane, methyltrimethoxysilane, methyl tri(2-methoxyethoxy)silane, vinyl trimethoxysilane or vinyltriethoxysilane. Methyl- and vinyltrimethoxysilane are preferred. Component d) can also be a partial hydrolyzate of the alkoxysilane crosslinking agents.

All catalysts which are commonly used according to the prior art in RTV-1 compositions are suitable as organometallic compounds e). Organic titanium and tin compounds are particularly preferred. Cross-linkable polysiloxanes a) containing the reactive groups —O—SiR¹(OR²)₂, —O—Si(OR²)₃ are preferably used in combination with organic tin compounds, the groups $R^1$ and $R^2$ having the meaning already mentioned. Particularly preferred tin compounds are e.g. diorganotin dicarboxylates, such as dibutyltin dilaurate and dioctyltin maleate as well as solutions of diorganotin oxides in silicic acid esters. Preferred titanium compounds are alkyl titanates, such as for example tetraisopropyl titanate or tetrabutyl titanate and chelated titanium compounds, such as diisobutyl bis(ethyl acetoacetate) titanate, diisopropyl bis(acetylacetonate) titanate or diisopropyl bis(ethylacetoacetate) titanate.

Additives and auxiliary substances f) for the purposes of the invention are preferably plasticizers, bonding agents, pigments and fungicides.

In a preferred specific embodiment of the present invention, the auxiliary substances f) are silicone plasticizers, such as for example polydimethylsiloxanes having terminal trimethylsiloxy groups and a viscosity of 0.1 to 5 Pa·s, bonding agents, such as for example organofunctional silanes of the formulae:

X—CH₂—CH₂—CH₂—Si(OR²)₃ in which X=—NH—CH₂—CH₂—NH₂,

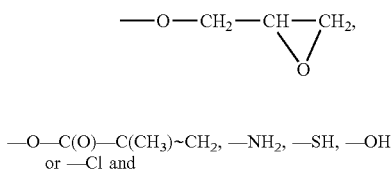

—O—C(O)—C(CH$_3$)~CH$_2$, —NH$_2$, —SH, —OH or —Cl and

R$^2$ has the meaning already mentioned above.

The silicone compositions according to the invention preferably consist of
100 parts by weight of a),
10 to 250 parts by weight of b),
0.1 to 25 parts by weight of c),
1 to 30 parts by weight of d)
0.1 to 20 parts by weight of e) and
0 to 240 parts by weight of f).

The total quantity of auxiliary substances and additives f) preferably comprises:
0–100 parts by weight of plasticizers,
0–20 parts by weight of bonding agents,
0–100 parts by weight of pigments and 0–20 parts by weight of fungicides, the sum of all the components f) in the mixture being at most 240 parts by weight.

The present invention also provides a process for the production of the polysiloxane compositions according to the invention. The components a) to f) are mixed with the exclusion of moisture. Preferably the components a), b) and c) are initially introduced and the other components are then added.

The phosphorus compounds c) according to the invention are preferably incorporated into the compositions in the course of the production of the polysiloxane compositions. In a particularly preferred specific embodiment of the present invention the basic fillers b) and the phosphorus compound c), optionally dissolved in a suitable solvent, are mixed in a preliminary operation. Water or polar or non-polar organic solvents, such as for example alcohols and aromatic or aliphatic hydrocarbons, can for example be used as suitable solvents.

The present invention also relates to surface-modified fillers which are obtainable by reacting at least one basic filler b) with at least one phosphorus compound c) from the group comprising orthophosphoric acid esters of the following formula I

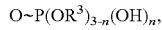O~P(OR$^3$)$_{3-n}$(OH)$_n$, in which
n=0, 1 or 2 and
R$^3$=an optionally substituted linear or branched C$_1$–C$_{30}$-alkyl, C$_1$–C$_{30}$-acyl, C$_2$–C$_{30}$-alkenyl, C$_2$–C$_{30}$-alkoxyalkyl, C$_5$–C$_{14}$-cycloalkyl or C$_6$–C$_{10}$-aryl group or a triorganosilyl or diorganoalkoxysilyl group which can be the same or different within the molecule, and/or esters of polyphosphoric acid, if appropriate in a solvent.

R$^3$ is preferably C$_1$–C$_{30}$-alkyl.

Preferred solvents are water or polar or non-polar solvents, such as for example alcohols, aromatic or aliphatic hydrocarbons and/or polydimethylsiloxanes. These surface-modified fillers are hydrophobic.

The present invention also relates to the use of the polysiloxane compositions according to the invention as sealants, adhesives or coating materials.

The present invention also relates to the use of the surface-modified fillers in polysiloxane compositions, plastics, such as for example PVC, thermoplastics, rubber, polysulphide sealants, polyurethane compositions, paints or lacquers.

The following examples serve to illustrate the invention without, however, having any limiting effect.

EXAMPLES

General Procedure for the Preparation and Evaluation of the Compositions

The compositions were prepared in a 1-liter planetary mixer in accordance with the examples listed hereinafter. After the preparation the compositions were filled into plastic cartridges and sealed. The material for the appropriate further tests was freshly extruded directly from the cartridges.

The cross-linking behaviour of the polysiloxane compositions was tested on a glass plate, for which purpose the pastes were applied in a layer thickness of 2 mm to an area of 40×60 mm. After 24 hours the layer of material was cut, peeled off by hand and the underneath surface felt in order to determine whether the layer had cured through to the glass surface.

In order to determine the mechanical properties of the vulcanizates, layers of a thickness of 2 mm were produced from the pastes. After leaving the layers to cure for 14 days at 23° C. and 50% relative atmospheric humidity the vulcanizates were tested according to DIN 53 504. Their hardness was determined after leaving them to cure for 21 days according to DIN 53 505.

The storage life of the products was evaluated by storing the pastes in an aluminium tube with a screw cap at 50° C. Samples were taken at one-weekly intervals and tested for cross-linking. If the samples were perfectly cross-linked 1 week after the extrusion, the test was considered to have been passed. The test for storage life at 50° C. is a method which is commonly used for the evaluation of sealants. It is a quick test for determining the storage life of the products in practice.

Examples 1 to 8

In a planetary mixer, 44.0 parts by weight of a polydimethylsiloxane containing terminal Si(CH$_3$)$_2$OH groups which had a viscosity of 50 Pa·s at 25° C. were mixed with 45.0 parts by weight of a precipitated chalk (BET specific surface area 19 m$^2$/g) which had been treated with stearic acid. Various phosphoric acid esters were added and dispersed in the mixture to form a homogeneous paste. The following compounds were used in the quantities listed in Table 1:

Example 1: di(2-ethylhexyl) phosphate
Example 2: mono(2-ethylhexyl) phosphate
Example 3: monoisodecyl phosphate
Example 4: 1:1 mixture of mono- and di-isononyl phosphate
Example 5: trimethylsilyl-di(2-ethylhexyl) phosphate
Example 6: trimethylsilyl-di(2-ethylhexyl) phosphate
Example 7: bis(trimethylsilyl)-mono(2-ethylhexyl) phosphate
Example 8: tris(trimethylsilyl) phosphate Subsequently 8.0 parts by weight of a polydimethylsiloxane containing terminal —O—Si(CH$_3$)$_3$ groups and 2.5 parts by weight of methyltrimethoxysilane were stirred in and the composition of the paste was completed by adding 1.0 part by weight of diisobutylbis(ethyl acetoacetate) titanate as well as 0.1 part by weight of N-aminoethyl-3-aminopropyltrimethoxysilane.

The compositions of Examples 1 to 8 cured completely within 24 hours. The other properties of the compositions are shown in Table 1.

Comparative Example 9

The procedure of Examples 1 to 8 was repeated, the addition of the phosphoric acid ester being omitted. This composition was also completely cured after exposure to moisture for 24 hours. The testing of the storage life and the mechanical properties did however show that the product had inadequate properties. The storage life of only 2 weeks at 50° C. and the poor mechanical properties such as high hardness, low elongation and a high modulus of elasticity, very greatly restrict the possible use of such a product as a sealant.

Comparative Example 10

The procedure of Example 9 was repeated, with the addition of 1.5 parts by weight of dodecylbenzenesulphonic acid. The sealant layer cured completely within 24 hours. The storage life of the product does not differ from that of Comparative Example 5 without any additive and, at only 2 weeks at 50° C., is inadequate. The mechanical properties of the vulcanizate are of a high standard and include high elongation at break and a low modulus of elasticity (Table 1).

TABLE 1

Test results of Examples 1 to 10

| Example No. | Parts by weight of phosphate | Shore A hardness | Elongation at break [%] | Modulus of elasticity [N/mm$^2$] | Tear resistance [N/mm$^2$] | Storage life[1] at 50° C. [in weeks] |
|---|---|---|---|---|---|---|
| 1 | 1.5 | 28 | 880 | 0.49 | 2.0 | 4 |
| 2 | 1.0 | 17 | 820 | 0.41 | 1.7 | 10 |
| 3 | 1.1 | 23 | 780 | 0.45 | 1.7 | 10 |
| 4 | 1.3 | 23 | 780 | 0.46 | 1.8 | 10 |
| 5 | 1.0 | 33 | 630 | 0.63 | 2.0 | 6 |
| 6 | 1.25 | 31 | 930 | 0.50 | 2.34 | 6 |
| 7 | 1.0 | 28 | 830 | 0.50 | 2.11 | 14 |
| 8 | 1.0 | 30 | 500 | 0.45 | 1.99 | 14 |
| 9[2] | — | 35 | 640 | 0.67 | 2.6 | 2[3] |
| 10[2] | 1.5[4] | 24 | 930 | 0.44 | 2.0 | 2[3] |

[1] after the indicated time the products were still in a perfect condition
[2] comparative example
[3] composition no longer cures after 3 weeks. The product is highly defective.
[4] dodecylbenzenesulphonic acid.

The invention claimed is:

1. Polysiloxane compositions which cross-link by condensation and which comprise:
  a) at least one cross-linkable polysiloxane comprising as a reactive terminal group at least one of the following groups —O—SiR$^1{}_2$OH, —O—SiR$^1$(OR$^2$)$_2$, or —O—Si(OR$^2$)$_3$, wherein
  R$^1$ denotes optionally substituted C$_1$–C$_8$-alkyl, C$_6$–C$_{14}$-aryl or C$_2$–C$_8$-alkenyl groups and R$^2$ denotes optionally substituted linear or branched C$_1$–C$_8$-alkyl or C$_2$–C$_8$-alkoxyalkyl groups, and R$^1$ and R$^2$ can be the same or different within the molecule,
  b) at least one basic filler and optionally other fillers,
  c) at least one phosphorus compound selected from the group consisting of
    i) orthophosphoric acid esters of the following formula O=P(OR$^3$)$_{3-n}$OH$_n$ in which
    n=0, 1 or 2 and
    R$^3$=an optionally substituted linear or branched C$_1$–C$_{30}$-alkyl, C$_1$–C$_{30}$-acyl, C$_2$–C$_3$-alkenyl, C$_2$–C$_{30}$-alkoxyalkyl, C$_5$–C$_{14}$-cycloalkyl or C$_6$–C$_{10}$-aryl group or a triorganosilyl or diorganoalkoxysilyl group and each R$^3$ can be the same or different within the molecule, and wherein when, n denotes 0, at least one of the substituents R$^3$ is a triorganosilyl or diorganoalkoxysilyl radical, and
    ii) esters of polyphosphoric acid,
  d) at least one alkoxysilane cross-linking agent selected from the group consisting of tetraethoxysilane, tetra-n-propoxysilane, methyltriethoxysilane, methyltrimethoxysilane, methyltri(2-methoxyethoxy)silane, vinyltrimethoxysilane, vinyltriethoxysilane and partial hydrolyzates thereof,
  e) at least one organometallic compound selected from the group consisting of organic titanium compounds and organic tin compounds and
  f) optionally other auxiliary substances selected from the group consisting of plasticizers, bonding agents, pigments and fungicides, wherein the phosphorus compound c) is an ester of orthophosphoric acid containing at least one optionally substituted linear or branched C$_4$–C$_{30}$-alkyl group R$^3$.

2. Polysiloxane compositions which cross link by condensation, according to claim 1, wherein the cross-linkable polysiloxane a) has a viscosity of between 0.1 and 1000 Pa·s.

3. Polysiloxane compositions according to claim 1, wherein the basic fillers b) are precipitated or ground chalks.

4. Polysiloxane compositions according to claim 1, wherein the organometallic compound e) is an organic titanium or tin compound.

5. Polysiloxane compositions according to claim 1 consisting essentially of
   100 parts by, weight of a),
   10 to 250 parts by weight of b),
   0.1 to 25 parts by weight of c),
   1 to 30 parts by weight of d),
   0.1 to 20 parts by weight of e) and
   0 to 240 parts by weight of f).

6. Polysiloxane compositions according to claim 1, wherein the auxiliary substance f) has the following composition:
   0–100 parts by weight of plasticizers,
   0–20 parts by weight of bonding agents,
   0–100 parts by weight of pigments,
   0–20 parts by weight of fungicides,
the sum of all the components f) in the mixture amounting to a maximum of 240 parts by weight.

7. Process for the production of the polysiloxane compositions of claim 1, wherein the basic fillers b) and the phosphorus compound c), optionally dissolved in a solvent, are mixed in a preliminary operation.

8. Sealants, adhesives or coating compositions, comprising a composition of claim 1.

* * * * *

UNITED STATES PATENT AND TRADEMARK OFFICE
CERTIFICATE OF CORRECTION

PATENT NO. : 7,049,384 B1
APPLICATION NO. : 08/894824
DATED : May 23, 2006
INVENTOR(S) : Friebe et al.

It is certified that error appears in the above-identified patent and that said Letters Patent is hereby corrected as shown below:

Column 3, Line 55, "O~P(OR$^3$)$_{3-n}$(OH)$_n$," should read -- O=P(OR$^3$)$_{3-n}$(OH)$_n$, --

Column 4, Line 14, "agents, d)" should read -- agents d) --

Column 4, Line 24, "alkyl linear or" should read -- alkyl, linear or --

Column 7, Line 67, "C$_{c-c8}$-alkenyl" should read -- C$_2$-C$_8$-alkenyl --

Column 8, Line 15, "C$_2$-C$_3$-alkenyl" should read -- C$_2$-C$_{30}$-alkenyl --

Column 8, Line 19, "when, n denotes" should read -- when n denotes --

Column 8, Line 22, "ii)esters" should read -- ii)  esters --

Column 9, Line 3, "by, weight of" should read -- by weight of --

Signed and Sealed this

First Day of April, 2008

JON W. DUDAS
*Director of the United States Patent and Trademark Office*